June 29, 1965  G. B. DAVIS  3,191,829
CAR-TOP CAMPER APPARATUS
Filed June 17, 1963  2 Sheets-Sheet 1

INVENTOR.
Glenn B. Davis
BY
Hovey, Schmidt, Johnson & Hovey
ATTORNEYS

June 29, 1965 G. B. DAVIS 3,191,829
CAR-TOP CAMPER APPARATUS
Filed June 17, 1963 2 Sheets-Sheet 2

INVENTOR.
Glenn B. Davis
BY
Hovey, Schmidt, Johnson & Hovey
ATTORNEYS.

United States Patent Office 3,191,829
Patented June 29, 1965

3,191,829
CAR-TOP CAMPER APPARATUS
Glenn B. Davis, 9539 Catalina, Overland Park, Kans.
Filed June 17, 1963, Ser. No. 288,196
11 Claims. (Cl. 224—42.1)

This invention relates generally to car-top carriers, and, more specifically, to car-top camping apparatus embodying improved means for mounting the apparatus upon an automobile to afford maximum convenience and ease of operation for both the automobile and the camping apparatus.

It is the primary object of this invention to provide a car-top carrier, particularly in the form of camping apparatus, that will not limit access to the trunk of the automobile when the carrier is mounted thereon.

Another important object of this invention is to provide mounting means for a car-top carrier that normally attaches the carrier to the frame of the automobile but which may be operated when the vehicle is stationary in a manner to shift the support of the carrier from the vehicle frame to the ground.

Still another object of this invention is to provide mounting means as in the above object, that is adjustable to enable the operator to level the carrier in the event that the automobile is parked on a hillside or other slope.

Yet another object of this invention is to provide selectively operable mounting means for a car-top carrier which, in one mode of operation, attaches the carrier directly to the frame of the vehicle and, in another mode of operation, places the weight of the carrier upon the ground to provide additional stability.

Still a further object of this invention is to provide selectively operable mounting means as in the last-mentioned object, that is carried by the automobile frame and which requires no tools or additional attachments for operation.

Other objects will become apparent as the detailed description proceeds.

Figure 1:
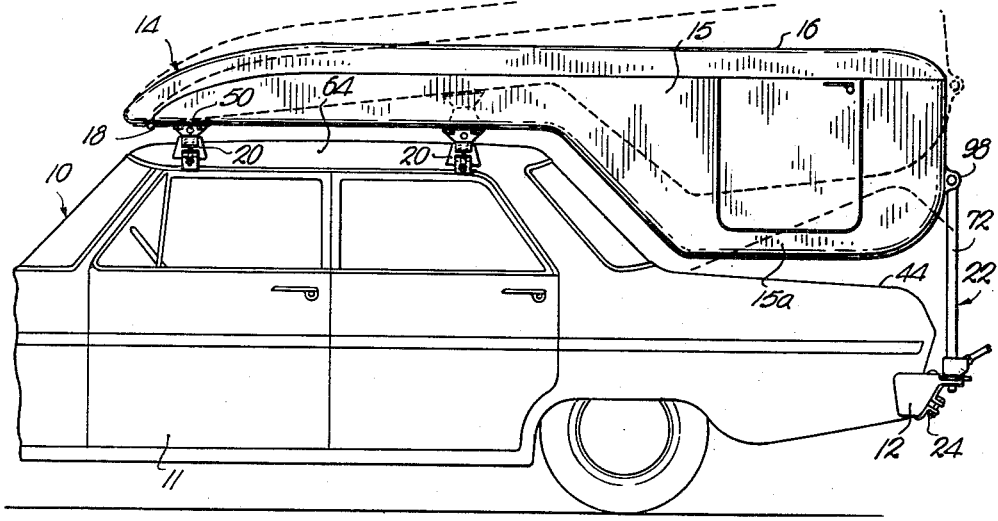
FIG. 1 is a side elevational view of an automobile with the car-top carrier of the instant invention mounted thereon, the heavy lines illustrating the position of the carrier during normal usage thereof.

Referring to the figures, an automobile 10 is shown having a body 11 and a frame or equivalent supporting structure therewithin upon which a rear bumper 12 is mounted and which may, therefore, be considered as a part of the frame. In overlying relationship to the automobile is a carrier in the form of an enclosure 14 having a hollow body 15 and an overlying cover 16 hingedly connected with the body at 18. Body 15 is provided with a bulb or bulge 15a which follows the contours of the rear of the automobile body 11. It may be seen, particularly in FIG. 1, that enclosure 14 has a shallow section overlying the top 64 of the automobile and a deep section formed by bulge 15a which overlies trunk deck 44. This provides enclosure 14 with maximum volume for a given length and height without materially impairing the handling characteristics of the automobile at highway speeds.

Figure 2:
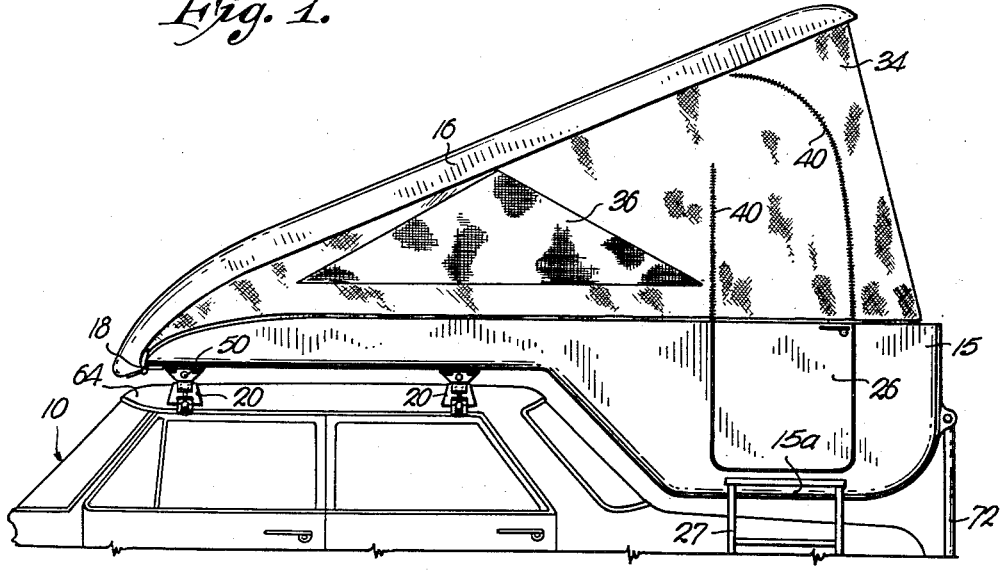
FIG. 2 is a fragmentary, side elevational view showing the carrier with its cover in the raised position.
Figure 3:
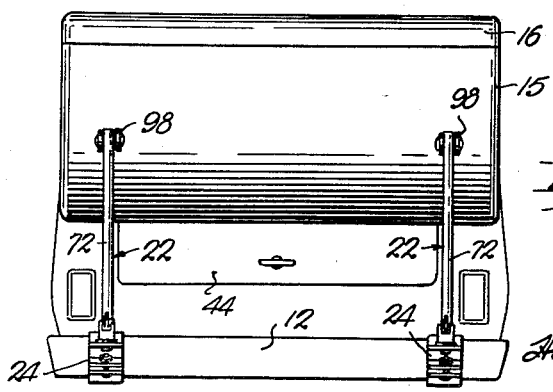
FIG. 3 is a rear elevational view of the automobile and the carrier.
Figure 4:
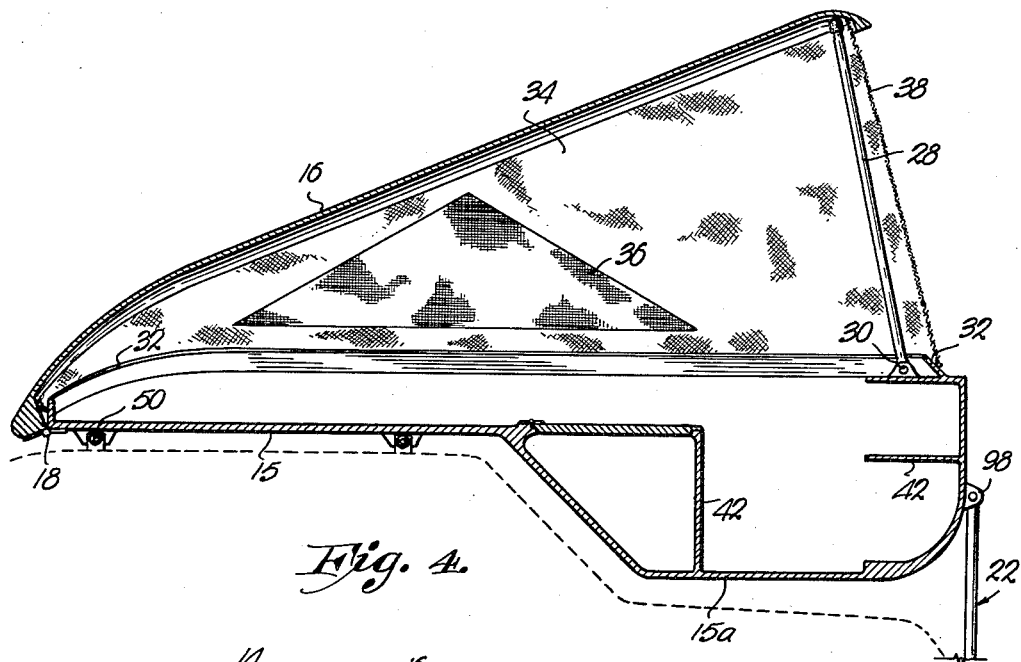
FIG. 4 is a central, longitudinal section through the carrier.
Figure 5:
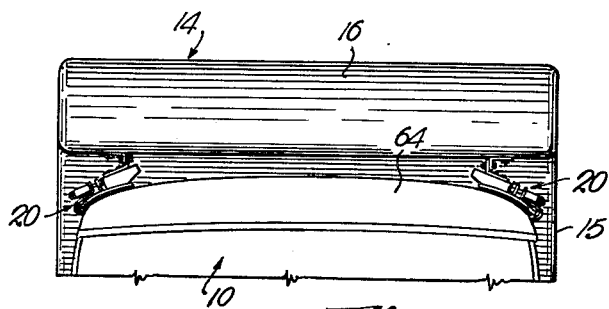
FIG. 5 is a fragmentary, front elevational view of the automobile and carrier.

Enclosure 14 is supported by four brackets 20 and a pair of extensible and retractable devices 22. Each device 22 is coupled with bumper 12 by means of bumper mounting bracket structure 24. Body 15 is provided with an upper, peripheral edge or margin 32 which defines an opening therein. Cover 16 may be shifted between a position overlying edge 32 in closing relationship with body 15 during transporting of the enclosure (as shown in FIG. 1), and a raised position for use during camping or loading where the height of enclosure 14 is increased (as shown in FIGS. 2 and 4).

Access to enclosure 14 is provided by a door 26 in the side of bulge 15a. A ladder 27 may be used in entering and leaving the enclosure. Either before or upon entering the enclosure the cover 16 may be raised to the position shown in FIGS. 2 and 4 and held by a leg 28 hingedly connected to body 15 at 30. The upper end of leg 28 engages cover 16 in any suitable fashion so as to hold the cover in the raised position, as is evident in FIG. 4. A plurality of legs 28 may be employed if desired to properly support the cover.

When the cover 16 is raised, a canvas sheet 34 may be employed to protect the occupants of the enclosure. If desired, a screen 36 may be sewn or otherwise fastened to a mating opening in canvas 34 to provide ventilation occupants. It may also be desired to employ a screen 38 in the rear panel of canvas 34. Furthermore, zippers 40 may be provided in the canvas in conjunction with door 26 to facilitate entry into the enclosure when the cover 16 is raised.

With the cover in the raised position it may be appreciated that the space formed within the enclosure due to the presence of bulge 15a is sufficiently large to allow an individual to stand upright therein. Sufficient space is provided in both the bulge and the remainder of body 15 to accommodate several sleeping occupants. Partitions such as shown at 42 may be conveniently disposed in the enclosure to serve as shelves or as mounting supports for kitchen appliances.

Bulge 15a extends downwardly and rearwardly from top 64 of automobile 10 and overlies trunk deck 44, the underside of the bulge being in closely spaced relationship to deck 44. Therefore, as is especially evident in FIG. 1, when enclosure 14 is in the normal position shown by the full lines, access to the trunk is limited since full opening of trunk deck 44 is prohibited by bulge 15a. The dotted lines, however, illustrate that the enclosure may be shifted to a position where trunk deck 44 may conveniently be raised in the usual manner. Apparatus for effecting this valuable feature will now be described.

Figures 6, 9:
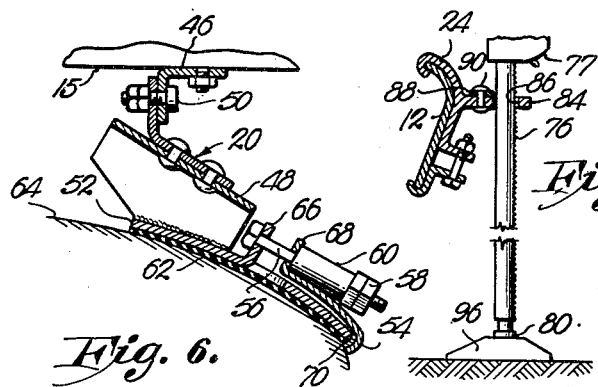
FIG. 6 is a detailed view partially in section and partially in elevation showing the car-top mounting bracket employed in the instant invention.
FIG. 9 is a fragmentary, detailed view of the mounting device showing the same operated in a manner so that the weight of the carrier is supported by the ground.

Reference is made particularly to FIG. 6 wherein one of the brackets 20 is shown in detail. It may be seen that an angular member 46 is secured to the underside of body 15 and that a clamp generally designated 48 is attached to member 46. Coupling between member 46 and clamp 48 is effected by a pivot pin 50 as is clearly shown in FIG. 6.

Clamp 48 includes an arcuate plate 52, a hook 54, a bolt 56, nuts 58, a spacer 60, and a pad 62. Pad 62 is attached to the under surface of plate 52 and engages the top 64 of the automobile. An upstanding tab 66 formed from plate 52 receives bolt 56. Hook 54 is provided with an ear 68 which also receives bolt 56. Hook 54 engages the underside of gutter 70, the gutter being a part of the automobile and rigidly secured to top 64. Thus, spacer 60 and nuts 58 may be slipped onto bolt 56 and tightened to clamp gutter 70 between hook 54 and the proximal edge of plate 52.

Figure 7:
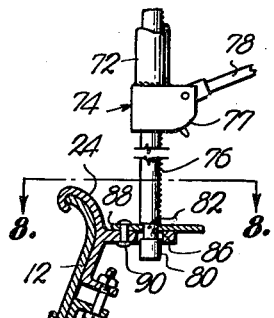
FIG. 7 is a fragmentary, detailed view showing the supporting device of the invention.
Figure 8:
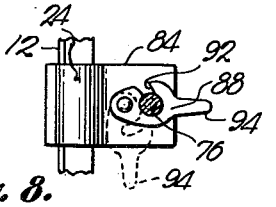
FIG. 8 is a view taken along line 8—8 of FIG. 7.

Reference is now made to FIGS. 7, 8 and 9 wherein one of the extensible devices 22 is shown in detail. Each device 22 comprises a tubular member 72 and a bumper jack 74. Jack 74 consists of a toothed member or rack 76 and a mechanism-containing housing 77 which rides on member 76. Member 72 is telescoped over member 76, the lower end of member 72 being welded or brazed to housing 77. Bumper jack 74 is a conventional and well known device employing a removable handle 78 for operation thereof. The hook usually associated with jack 74 for engaging the bumper of a vehicle, is not used. The lower end 80 of toothed member 76 is provided with a reduced portion 82 in the form of an annular recess for purposes to be explained hereinafter.

Structure 24 may be a conventional bumper mounting bracket widely used for attaching trailers and the like to the rear bumpers of vehicles. Mounting bracket 24 is provided with a plate 84 extending horizontally outwardly therefrom and rearwardly of the automobile. Plate 84 has a vertical opening 86 therethrough which receives member 76. Element 88 is swingably mounted on the upper surface of plate 84 for movement in a horizontal plane about pin 90.

It may be seen in FIG. 8 that element 88 is provided with a slot 92 which receives the reduced portion 82 of member 76 when element 88 is in the position shown by the full lines. The element is provided with a finger 94 facilitating manual grasping of the element so that the same may be shifted to the dotted line position shown.

It may be readily appreciated that when element 88 is in the postiion shown by the full lines, downward movement of member 76 is prohibited due to the engagement of the annular shoulders of member 76, formed by reduced portion 82, with element 88. Conversely, movement of element 88 to the dotted line position allows member 76 to move longitudinally downwardly through opening 86 until the lower end 80 reaches the ground. Preferably, as is illustrated in FIG. 9, end 80 is spaced from the ground by a base or foot 96 so as to spread the weight carried by member 76 over a larger surface area.

Hinges 98 are employed to pivotally attach the upper ends of tubular members 72 to the rear of body 15. It may be appreciated, therefore, that devices 22 are employed to support the enclosure either by attachment of the rear portion thereof to bumper 12 or by serving as a stand resting on the ground.

In the operation of the apparatus, enclosure 14 is normally disposed in overlying relationship to the top 64 of automobile 10 as shown by the heavy lines in the drawings. The enclosure is removed from or placed on top 64 by loosening or tightening the clamps 48 of the four brackets 20 and shifting element 88 to the dotted line position, thus enabling devices 22 to be separated or united with corresponding bumper bracket structures 24. The mechanism within the housing 77 of each jack 74 should be locked to prevent relative shifting of members 72 and 76 during the removal or mounting operation.

As mentioned previously in this specification, full opening of trunk deck 44 is prohibited when enclosure 14 is in the normal position on top 64. However, the enclosure may be moved into the dotted line position shown by releasing the clamps 48 associated with the two brackets 20 positioned at the rear of automobile top 46 and then actuating jacks 74. Actuation of jacks 74 causes members 72 to move longitudinally upwardly as the mechanism of each jack is operated to advance its housing 77 upwardly along the respective toothed member 76. Thus, the rear portion of enclosure 14 is raised to the dotted line position to permit full opening of trunk deck 44 by swinging the enclosure about a generally horizontal axis through pins 50 of the clamps 48 associated with the two brackets 20 positioned adjacent the forward end of the enclosure. The angular mounting members 46 of these two brackets should, therefore, be secured to body 15 adjacent the forward end thereof and in opposed relationship to provide an axis of rotation perpendicular to the longitudinal axis of the enclosure. It is requisite that the two forward brackets 20 be disposed sufficiently near the front edge of the top 64 to maintain the underside of the body 15 out of engagement with top 64 at all times during swinging of the enclosure. A camper or other party is thus able to easily remove a spare tire or other articles from the trunk of the automobile.

It is evident that reversal of the mechanisms of jacks 74 allows the operator to return enclosure 14 to the normal position. Furthermore, it should be appreciated that the jacks may be manipulated to level enclosure 14 when the automobile is parked on a grade. The vehicle under such conditions would be parked facing uphill so that swinging of the enclosure by the action of jacks 74 will effect leveling thereof.

After a location is reached where it is desired to park the automobile for an extended period of time, it may be desired to relieve the rear suspension of the automobile from the weight of enclosure 14 by utilizing the ground support feature of the instant invention. This is particularly the case when the apparatus is used for camping and the enclosure is to be used for sleeping purposes, due to the added weight of the occupants. The greater part of the weight is thus borne by the ground while the lesser part is distributed over all four wheels of the automobile. Furthermore, and most importantly, this ground support feature greatly aids in stabilizing the enclosure during windstorms and eliminates any substantial rocking or other motion during use.

It should be understood that the manually operated bumper jacks 74 shown and described herein, may be replaced by equivalent hydraulicaly or pneumatically operated apparatus without departing from the teachings of the instant invention. Such apparatus could be powered by the automobile motor or an auxiliary power source, or the necessary fluid pressure could be derived from manually operated means.

Having thus described the invention, what is claimed as new and desired to be secured by Letters Patent is:

1. For use with an automobile having a frame and a body mounted on the frame, said body having a top and a rear deck, mobile carrier apparatus comprising:
   an elongated enclosure adapted for disposition in overlying relationship to said top and said deck with the enclosure extending longitudinally thereof and presenting opposed, leading and trailing ends;
   means on said enclosure for mounting the latter on the body for swinging movement about a generally horizontal axis extending transversely of the enclosure adjacent said leading end; and
   means coupled with the trailing end of said enclosure and adapted to be carried by said frame for raising and lowering said trailing end to swing the enclosure about said axis, whereby to provide access to the rear deck when said trailing end is raised.

2. The invention of claim 1, wherein said enclosure is provided with a bulge at said trailing end thereof normally extending into overlying, closely spaced relationship to said deck of the automobile body, said mounting means being spaced from said bulge longitudinally of said enclosure.

3. The invention of claim 1, wherein said raising and lowering means includes an upstanding, elongated, longitudinally extensible and retractable device.

4. The invention of claim 3, wherein said raising and lowering means further includes structure for attaching the lower end of said device to said frame, the upper end of the device being coupled with said trailing end of the enclosure.

5. The invention of claim 4, wherein said structure is releasable and is constructed and arranged to permit said device to extend downwardly from said structure upon release thereof to a disposition adapting said lower end for support by the ground therebelow.

6. The invention of claim 4, wherein said structure includes a shiftable element movable between a first position maintaining said lower end of the device against vertical movement and a second position permitting said lower end to extend downwardly from said structure to a disposition adapting the lower end for support by the ground therebelow.

7. The invention of claim 3, wherein said device comprises a pair of elongated, longitudinally shiftable members and means operable to shift one member with respect to the other member, and wherein said raising and lowering means further includes structure for attaching the lower end of said other member to said frame, the upper end of said one member being coupled with said trailing end of the enclosure.

8. The invention of claim 7, wherein said structure is releasable and is constructed and arranged to permit longitudinal, downward movement of said other member to a disposition adapting said lower end for support by the ground therebelow upon release of the structure.

9. The invention of claim 7, wherein said structure includes a shiftable element movable between a first position engaging said lower end of the other member to maintain said other member against longitudinal shifting and a second position permitting longitudinal, downward movement of said other member to a disposition adapting said lower end for support by the ground therebelow.

10. The invention of claim 9, wherein said structure has an opening therethrough for receiving said other member, said lower end thereof being provided with a reduced portion, said element receiving said reduced portion when the element is in said first position.

11. The invention of claim 10, wherein said other member is telescoped within said one member.

References Cited by the Examiner
UNITED STATES PATENTS

| D. 192,795 | 5/62 | Sloat. | |
| 2,291,900 | 8/42 | Jimmes | 224—42.1 |
| 2,823,817 | 2/58 | Holsclaw | 214—506 |
| 2,907,077 | 10/59 | Pugsley | 5—119 X |

FOREIGN PATENTS

| 618,404 | 4/61 | Canada. |
| 276,016 | 9/51 | Switzerland. |

GERALD M. FORLENZA, *Primary Examiner.*

HUGO O. SCHULZ, *Examiner.*